(12) United States Patent
Hulick, Jr.

(10) Patent No.: US 11,343,281 B2
(45) Date of Patent: May 24, 2022

(54) ENHANCED WEB APPLICATION SECURITY COMMUNICATION PROTOCOL

(71) Applicant: Cisco Technology, Inc., San Jose, CA (US)

(72) Inventor: Walter Theodore Hulick, Jr., Pearland, TX (US)

(73) Assignee: Cisco Technology, Inc., San Jose, CA (US)

( * ) Notice: Subject to any disclaimer, the term of this patent is extended or adjusted under 35 U.S.C. 154(b) by 461 days.

(21) Appl. No.: 16/542,397

(22) Filed: Aug. 16, 2019

(65) Prior Publication Data

US 2021/0051179 A1    Feb. 18, 2021

(51) Int. Cl.
*H04L 29/06* (2006.01)
*G06F 9/54* (2006.01)

(52) U.S. Cl.
CPC .............. *H04L 63/20* (2013.01); *G06F 9/546* (2013.01); *H04L 63/105* (2013.01)

(58) Field of Classification Search
CPC ....... G06F 21/52; G06F 9/546; H04L 63/105; H04L 63/20
See application file for complete search history.

(56) References Cited

U.S. PATENT DOCUMENTS 6,658,463 B1    12/2003  Dillon et al.
6,775,772 B1    8/2004   Binding et al.
9,268,945 B2    2/2016   Williams et al.
9,496,989 B2    11/2016  Wang et al.
10,027,627 B2   7/2018   Parla et al.
2017/0220798 A1* 8/2017  Madou ................. G06F 21/554
2020/0128085 A1* 4/2020  Khait .................... H04L 67/142
2020/0410083 A1* 12/2020 Fidanza ................. G06F 21/78

OTHER PUBLICATIONS

Lupesko, Hagay., "How to Secure Your Web App With HTTP Headers", Smashing Magazine, https://www.smashingmagazine.com/2017/04/secure-web-app-http-headers/, 9 pages, Apr. 3, 2017, smashingmagazine.com.

(Continued)

*Primary Examiner* — Bryan Lee
(74) *Attorney, Agent, or Firm* — Behmke Innovation Group LLC; James M. Behmke; Jonathon P. Western

(57) ABSTRACT

In one embodiment, a device of a first security type obtains an application message for an application transaction along with a transaction ID. The device inserts an instruction related to the application transaction into a first header of the application message, and sends the application message downstream. The device may then receive an application response message from a downstream device in response to the application message, the downstream device of a second security type different from the first security type, the application response message having a reply to the instruction in a second header of the application response message and the transaction ID correlating the application response message to the application transaction. As such, the device may then perform one or more reactive actions in response to the reply to the instruction. In another embodiment, the downstream device conversely receives the instruction and inserts the reply.

18 Claims, 16 Drawing Sheets

(56) References Cited

OTHER PUBLICATIONS

Hodges, et al., "HTTP Strict Transport Security (HSTS)", Internet Engineering Task Force (IETF)—Request for Comments: 6797, 46 pages, Nov. 2012, IETF Trust.
Kim, et al., "In-band Network Telemetry (INT)", https://p4.org/assets/INT-current-spec.pdf, 28 pages, Jun. 2016.
"Downgrade attack", https://en.wikipedia.org/wiki/Downgrade_attack, 1 page, Accessed on Oct. 2, 2018., Wikimedia Foundation, Inc.
"HTTP Strict Transport Security", https://en.wikipedia.org/wiki/HTTP_Strict_Transport_Security#cite_note-https-1, 6 pages, Accessed on Oct. 2, 2018., Wikimedia Foundation, Inc.
"HTTPS", https://en.wikipedia.org/wiki/HTTPS, 9 pages, Accessed on Oct. 2, 2018, Wikimedia Foundation, Inc.
"Hypertext Transfer Protocol", https://en.wikipedia.org/wiki/Hypertext_Transfer_Protocol, 13 pages, Accessed on Oct. 15, 2018., Wikimedia Foundation, Inc.
"Internet Engineering Task Force", https://en.wikipedia.org/wiki/Internet_Engineering_Task_Force, 6 pages, Accessed on Oct. 15, 2018., Wikimedia Foundation, Inc.
"Internet Standard", https://en.wikipedia.org/wiki/Internet_Standard, 4 pages, Accessed on Oct. 2, 2018., Wikimedia Foundation, Inc.
"OWASP Secure Headers Project", https://www.owasp.org/index.php/OWASP_Secure_Headers_Project, 1 page, Accessed on Oct. 2, 2018., owasp.org.
"Session hijacking", https://en.wikipedia.org/wiki/Session_hijacking, 4 pages, Accessed on Oct. 2, 2018., Wikimedia Foundation, Inc.

* cited by examiner

| Count | EventId 905 | Transaction Start | Transaction Stop | TransactionDetails 920 | Blocked 925 | Misc Security Events | Permission Request Events 935 |
|---|---|---|---|---|---|---|---|
| 3 | 9cab82e3-e572-4350-be06-6dadd59f8fe7 | Mon Jun 25 11:32:18 CDT 2018 | Mon Jun 25 11:32:18 CDT 2018 | tx.detail.client.address= 0:0:0:0:0:0:0:1 tx.detail.client.port= 50761 tx.detail.server.name= Apache Tomcat/8.5.24 tx.detail.server.address= 0:0:0:0:0:0:0:1 tx.detail.appname=resteasy tx.node.id= SecurityAppNodeName: 192.168.1.25 tx.detail.url=http://localhost: 8088/SecurityEvent DemoServlet/execute? openfile=sensitive.txt& markUnauthorized=true tx.detail.thread= UnauthorizedThread tx.detail.server.port=8088 | Permission ("java.io.File Permission" "sensitive.txt" "write") was not granted due to Unauthorized Content... | | Permission: ("java.io.File Permission" "sensitive" CodeLibrary: unknown Stamp: Mon Jun 2 11:32:18 CDT 201 Stack: java.lang. SecurityManager.c ● ● ● |

FIG. 9

| Count | EventId | Transaction Start | Transaction Stop | TransactionDetails | Blocked | Misc Security Events | Permission Request Events |
|---|---|---|---|---|---|---|---|
| 6 | 7b8d38e5-7ce9-4101-9238-4c8165fffd75 | Mon Jun 25 14:35:24 CDT 2018 | Mon Jun 25 14:35:24 CDT 2018 | tx.detail.client.address=0:0:0:0:0:0:0:1 tx.detail.client.port=54285 tx.detail.server.name=Apache Tomcat/8.5.24 tx.detail.server.address=0:0:0:0:0:0:0:1 tx.detail.appname=resteasy tx.node.id=SecurityAppNodeName: 192.168.1.25 tx.detail.url=http://localhost:8088/SecurityEvent DemoServlet/execute?accesscontrolexception tx.detail.thread=MyApplicationThread tx.detail.server.port=8088 | Access Control Exception occurred - Unauthorized access to application configuration file | | |

905 — Count column
910 — Transaction Start
915 — Transaction Stop
920 — TransactionDetails
925 — Blocked
930 — Misc Security Events
935 — Permission Request Events
1000 — overall view

FIG. 10

| | Current Security Events | |
|---|---|---|
| JarFile 1105 | | Manifest 1110 |
| /Users/ted.hulick/TestCode/SecurityContextModule/apache-tomcat-8.5.24/webapps/SecurityEventRestService/WEB-INF/lib/resteasy-jaxrs-2.2.1.GA.jar | | Archiver-Version=Plexus Archiver<br>Manifest-Version=1.0<br>Created-By=Apache Maven<br>Built-By=billburke<br>Build-Jdk=1.6.0_24 |
| /Users/ted.hulick/TestCode/SecurityContextModule/apache-tomcat-8.5.24/webapps/SecurityEventRestService/WEB-INF/lib/jackson-core-asl-1.6.3.jar | | rg.codehaus.jackson.annotate,org.codehaus.jackson.impl,org.codehaus.j=",org.codehaus.jackson.io;version="1.6.3", org.codehaus.jackson.sym;ve=<br>Bundle-License=<br>Specification-Version=1.0<br>il,org.codehaus.jackson";version="1.6.3",org.codehaus.jackson.sym;use=<br>Bnd-LastModified=1291508066065<br>Bundle-Name=Jackson JSON processor<br>Specification-Vendor=<br>Import-Package=org.codehaus.jackson;version="1.6.3", org.codehaus.jack<br>Export-Package=<br>Bundle-SymbolicName=jackson.io,org.codehaus.jackson.util";versio=<br>Built-By=tsaloranta<br>Tool=Bnd-unknown version<br>Implementation-Title=Jackson JSON processor<br>•<br>•<br>• |

FIG. 11

ENHANCED WEB APPLICATION SECURITY COMMUNICATION PROTOCOL

TECHNICAL FIELD

The present disclosure relates generally to computer systems, and, more particularly, to an enhanced web application security communication protocol.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect, and to integrate such data with network operations, generally.

In particular, although security products for applications have become more prevalent in recent years, such as those implementing Runtime Application Self Protection (RASP) components in the application runtime, the integration between such application-based security and network operations has been generally inefficient or nonexistent. On the other hand, while it is common to have security products at the network level, such as firewalls, Web Application Firewalls (WAFs), and end point management systems to provide a security context based on a network perspective, there has historically been a limited ability of network security products to efficiently correlate/communicate with the dissimilarly oriented application security product viewpoints.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 9 illustrates an example user interface showing a security event generated in response to opening a file and blocking the transaction in accordance with one or more embodiments described herein;

FIG. 10 illustrates an example user interface showing a security event generated in response to an access control exception in accordance with one or more embodiments described herein;

FIG. 11 illustrates an example user interface showing a listing of application components generated in accordance with one or more embodiments described herein;

DESCRIPTION OF EXAMPLE EMBODIMENTS

Overview

Figure 1A:
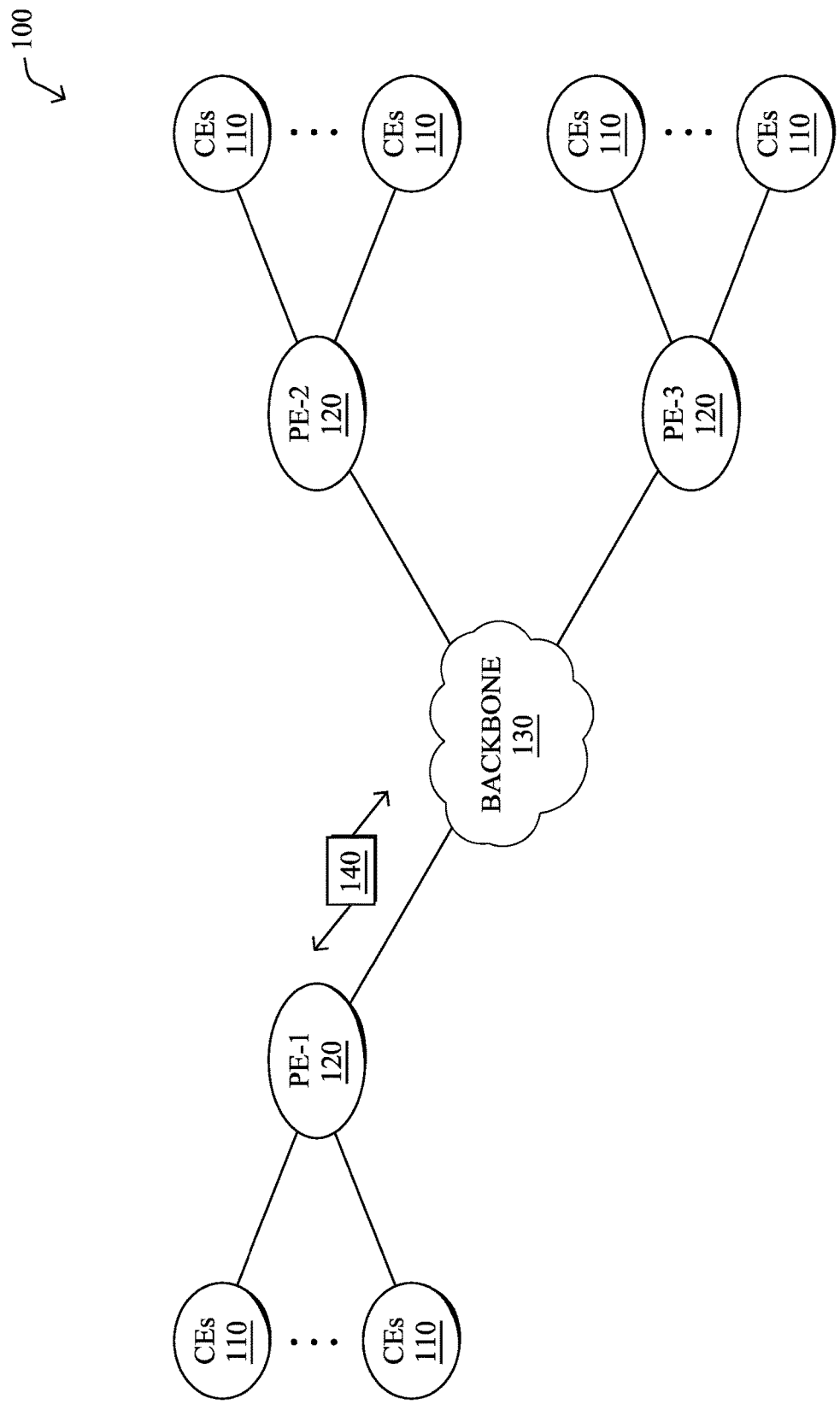
FIGS. 1A-1B illustrate an example computer network.

According to one or more embodiments of the disclosure, a device of a first security type obtains an application message for an application transaction, the application message having a transaction identifier (ID) for the application transaction. The device may then insert an instruction related to the application transaction into a first header of the application message, and sends the application message downstream with the instruction in the first header and the transaction ID. The device may then receive an application response message from a downstream device in response to the application message, the downstream device of a second security type different from the first security type, the application response message having a reply to the instruction related to the application transaction in a second header of the application response message and the transaction ID correlating the application response message to the application transaction. As such, the device may then perform one or more reactive actions in response to the reply to the instruction related to the application transaction.

According to one or more additional embodiments of the disclosure, a device of a first security type may receive an application message for an application transaction, the application message having a transaction identifier (ID) for the application transaction, the application message further having an instruction related to the application transaction inserted into a first header of the application message by an upstream device of a second security type different from the first security type. Here, the device may perform one or more reactive actions in response to the instruction related to the application transaction. Upon obtaining an application response message in response to the application message, the application response message having the transaction ID correlating the application response message to the application transaction, the device may insert a reply to the instruction related to the application transaction in a second header of the application response message, and sends the application response message with the reply to the instruction and the transaction ID toward the upstream device to cause the upstream device to perform one or more reactive actions in response to the reply.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
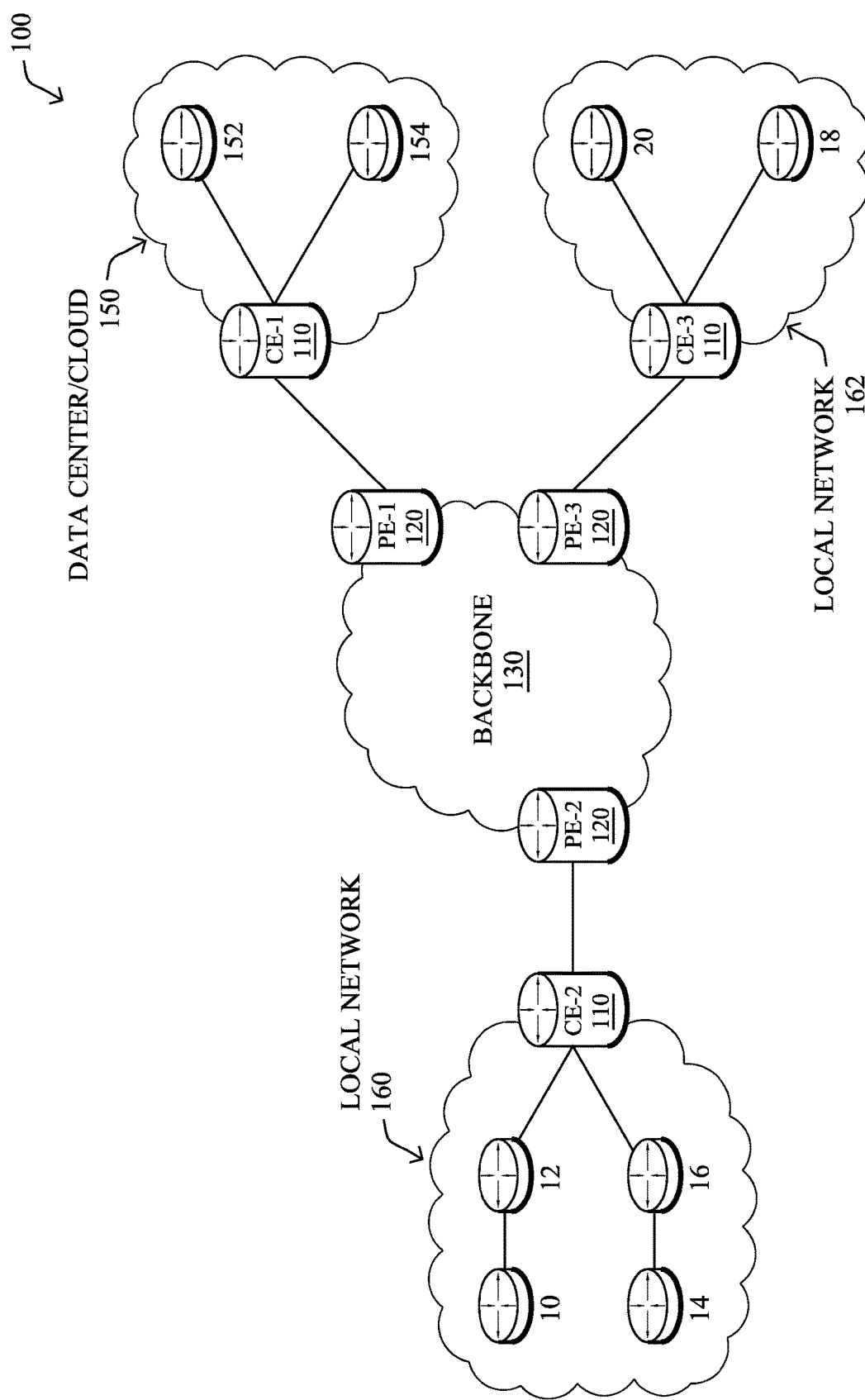

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
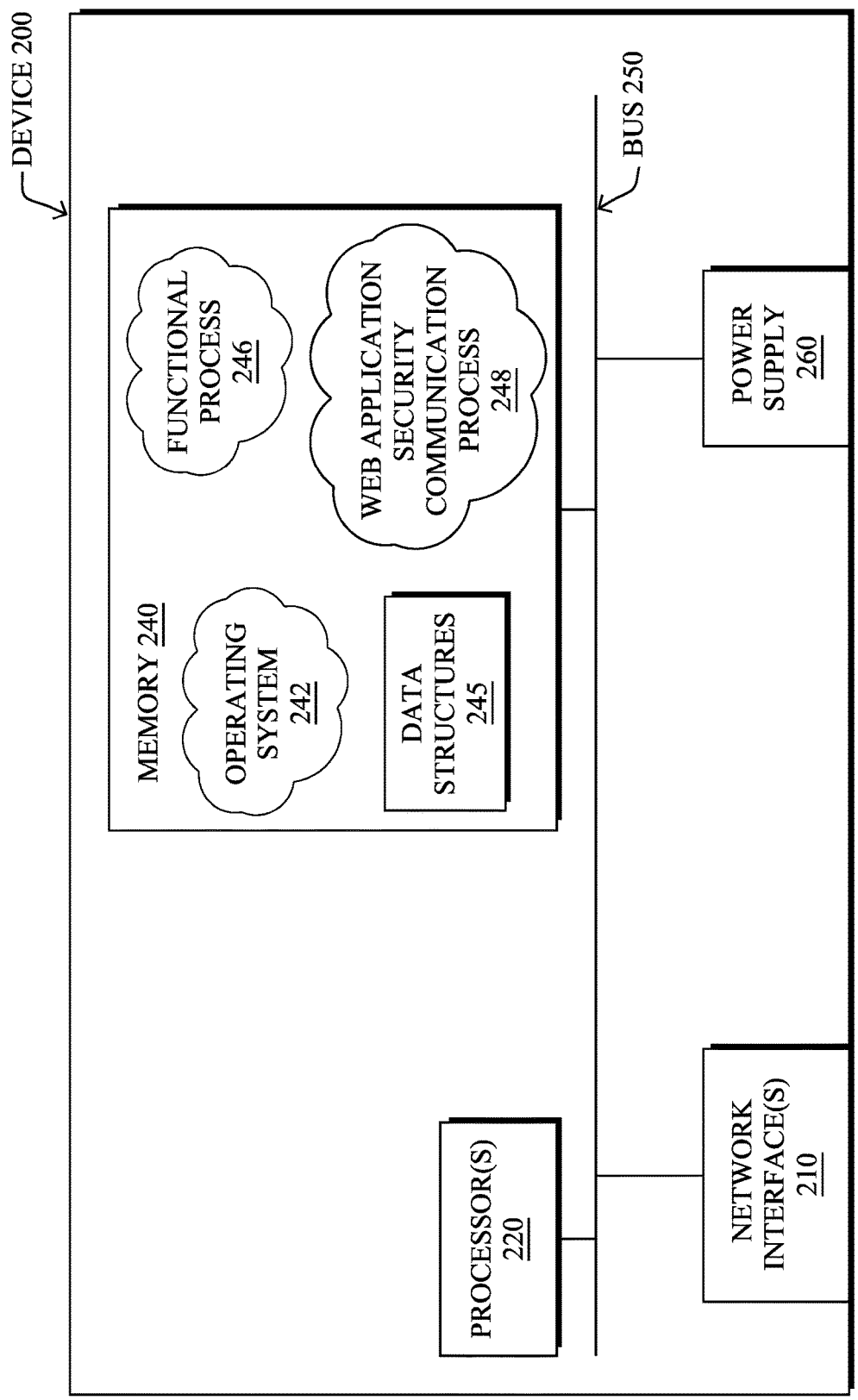
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "web application security communication" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Application Intelligence Platform—

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
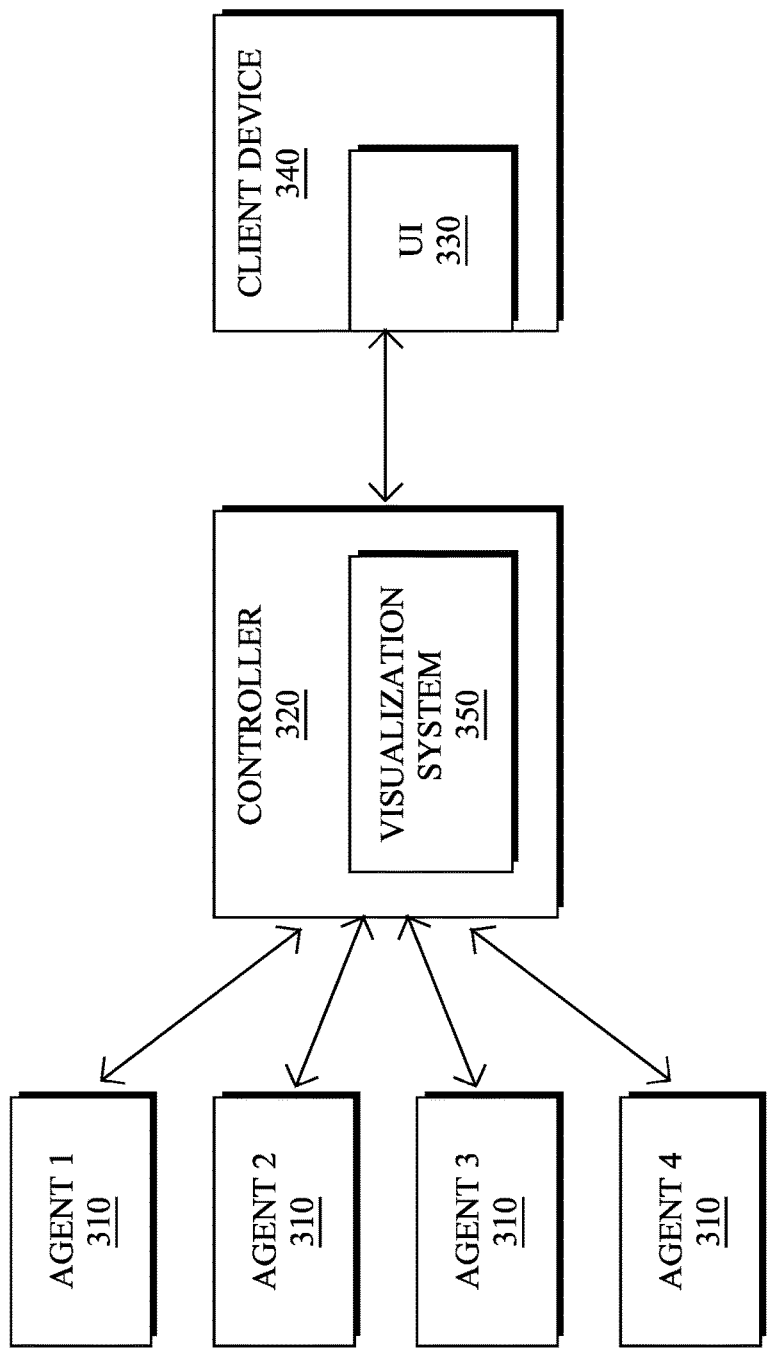
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premises (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller.

Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
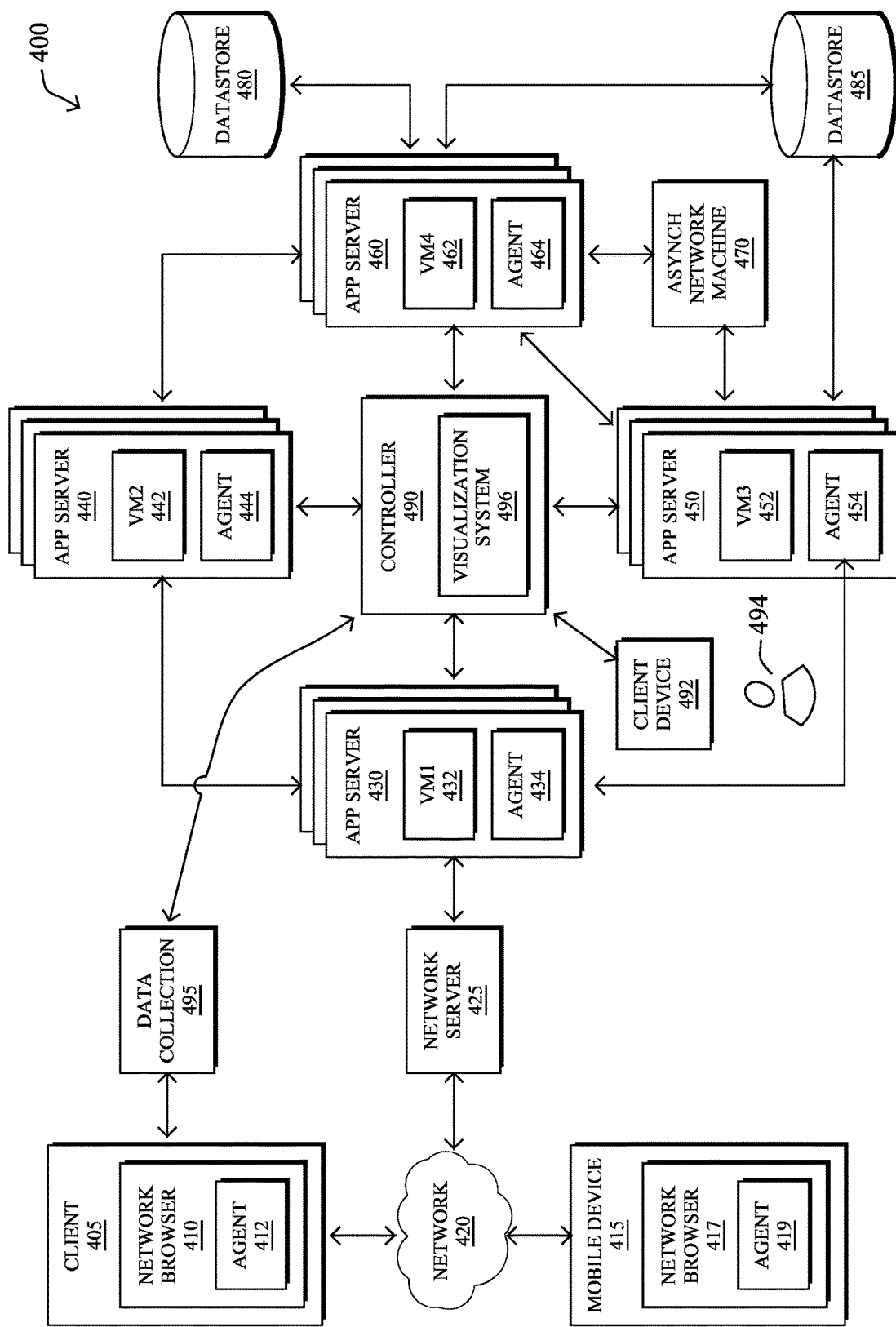
FIG. 4 illustrates an example system for implementing the example application intelligence platform.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 495, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 495 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 4). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules.

Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 460. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 495. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 490 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
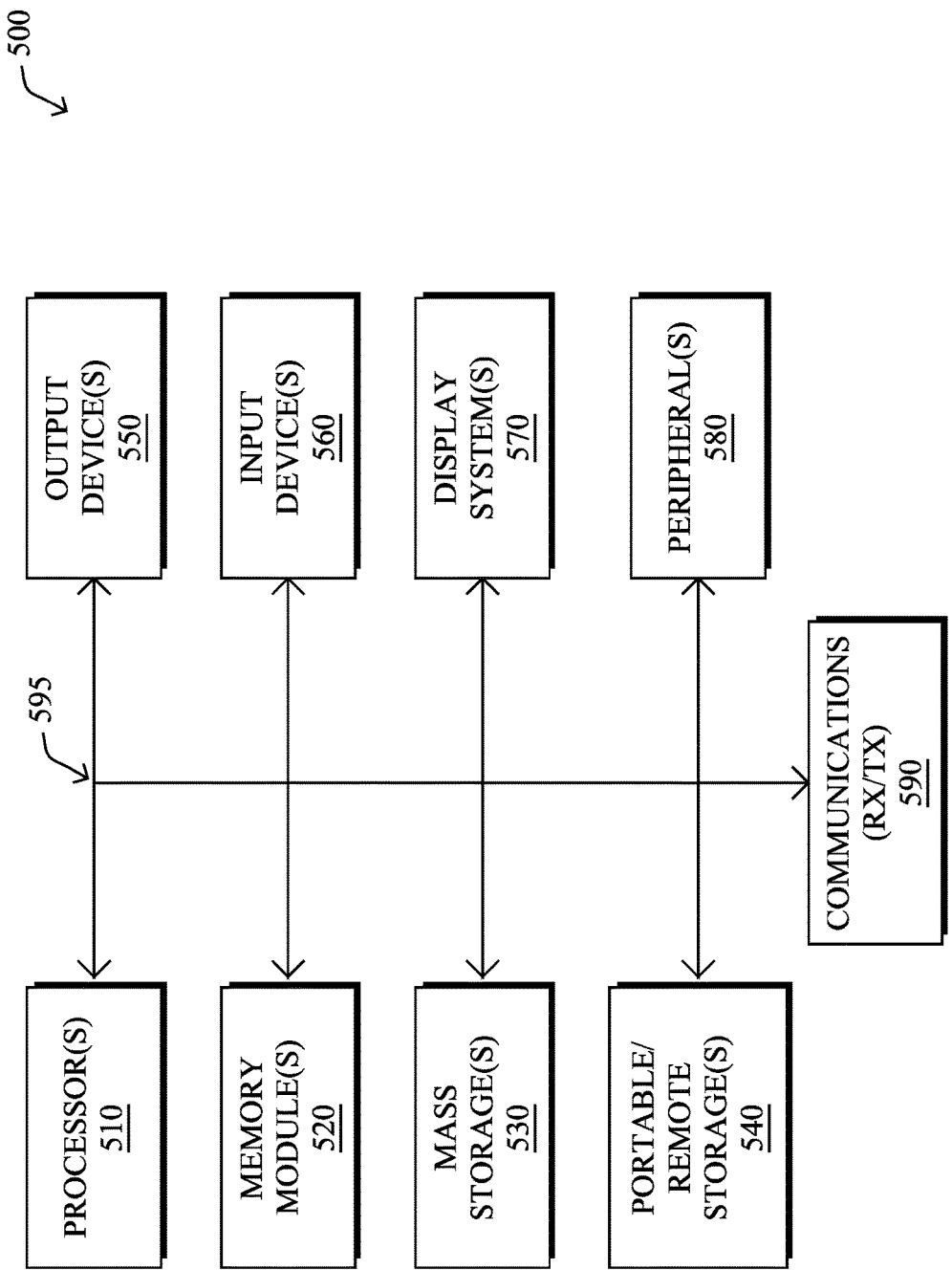
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, asynchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present disclosure for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present disclosure may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

—Enhanced Web Application Security Communication Protocol—

As noted above, security products for applications have traditionally been poorly integrated with network operations, while network-based security products have also been ineffective at coordination with application-based security measures. In addition, most network-based security products are unable to provide "Application Context", answering questions such as:

Who is the user behind this action?
What code module is opening this file—is that module new?
Does that user have admin permissions?
What protocol/code is behind this connection?
What third party libraries are listening for connections?
Is there new code or modules?

These questions simply cannot be answered without visibility into the application runtime. Generally, the operating system (OS) and/or the network provides a certain level of visibility, but they do not provide sufficient granularity and real "reasoning" into what the application is doing.

"Runtime Application Self Protection" (RASP) is a newer technology that provides security from within the application, offering a greater level of visibility for security from the application perspective. However, actual utilization of RASP is limited in the market today for a number of reasons, including, among others, lack of trust in current RASP vendors putting their solutions on the applications, concerns about performance and reliability, conflicting agents (e.g., APM solutions exist with their own agents, conflicting with RASP agent operation), and, perhaps most importantly, a lack of integration with existing security infrastructure (e.g., firewalls, WAFs, etc.).

The techniques herein, on the other hand, provide a low-overhead communication mechanism to tightly integrate security products that run in the application (e.g., RASP) with existing security products that run in the network (e.g., firewalls, web application firewalls (WAFs), etc.), containers, or servers (endpoints), while alleviating many of the implementation concerns mentioned above. In particular, the techniques herein are illustratively based on full duplex inbound/outbound packet headers (e.g., HTTP headers) which control the communication between application instrumentation (e.g., RASP) inside the application with the upstream and downstream networking products. In one embodiment, the protocol may use the same communication channel as the application itself, thus requiring no additional communication or requests, "piggybacking" on an original transaction's request and response mechanism.

Specifically, according to one or more embodiments described herein, a device of a first security type obtains an application message for an application transaction along with a transaction ID. The device inserts an instruction related to the application transaction into a first header of the application message, and sends the application message downstream. The device may then receive an application response message from a downstream device in response to the application message, the downstream device of a second security type different from the first security type, the application response message having a reply to the instruction in a second header of the application response message and the transaction ID correlating the application response message to the application transaction. As such, the device may then perform one or more reactive actions in response to the reply to the instruction. According to one or more additional embodiments described herein, the downstream device conversely receives the instruction and inserts the reply.

Furthermore, as described in greater detail below, inbound communication comes from upstream instrumentation and uses a specific header inserted into the original application request. For example, this communication can be one or more of the following types, among others, generally referred to as "instructions":

A question/request—including information requested such as "User", "Role", "Components", "Configuration", etc.; and
 A command—a request for an application security (e.g., RASP) agent to take action, such as: "Block", "Logout", "Quarantine", "Escalate", etc.

Conversely, outbound communication comes from the application security (e.g., RASP) instrumentation, and uses a specific header inserted into the original application response.

These commands can be one or more of the following, among others, generally referred to as "replies":

An answer—e.g., either a direct response or an ID/URL for a Web Service to query to get the result to a question during the transaction response;
 An acknowledgement (Ack) to a command—e.g., a direct response acknowledging the receipt and execution of a command; and
 An identification of a security incident—e.g., an ID/URL for a Web Service Query to get all of the security events that occurred during the transaction for review. The actual transaction ID may be used to correlate the transaction to the incidents collected.

Operationally, the techniques herein are based on providing a communication protocol that is designed to link multiple security products, and the security features that are made possible by such communication. The security products are illustratively application-based security products versus network-based security products. Application-based security may be in the form of APM-based agents or application intelligence platform security agents/processes as described above, while network-based security, on the other hand, may be such things as firewalls, WAFs, routers, servers, and so on. Visibility and control depend on where the devices/processes are within the network: applications may not have insight into network operations, and network devices are out-of-band from applications. The security protocol itself is thus a full-duplex conversation between any security products, regardless of where they are in the network or what their role is, where the "piggybacking" communications on top of application messages visible to each of the disparate devices/processes is important for auto-correlation of the messages to particular application transactions (e.g., business transactions). In essence, the techniques herein share application context with network-based security solutions, thereby utilizing instrumentation that has been applied to the application runtime (such as Java, .NET, Go, Node.js, PHP, Python, etc.) to execute security control according to more granular application information (such as stack traces, username, user role, etc., described below) than what is possible via conventional endpoint, container, or network instrumentation. In addition, the communication protocol provides a mechanism for application-based security modules to respond to network-based "request headers" and to perform actions that were orchestrated by network-based security products, and in certain embodiments, vice versa as well.

Using this communication protocol, the techniques herein can identify security events during a transaction, send events and/or block that transaction, patch outbound responses (with a security header), and other security features, specifically based on provided application context, such as code traces for security events, users behind transactions, privilege modes/roles for users (e.g., admin, user, etc.), transaction names and contexts (e.g., extracting information from the application agent). Even further, the techniques herein can track security events in the context of a business transaction. For example, the techniques herein can determine sensitive permission requests by unauthorized modules (open files, open sockets, etc.), security and access control violation exceptions, command execution (serialization, XML, etc. injection attempts), and so on. In certain embodiments, the techniques herein may also provide security information about the application, such as generating a list of application components that can be used as an audit and/or lookup into the national vulnerability database (NVD) to find vulnerabilities, generating a list of application configuration settings that can indicate vulnerability in the configuration, and maintaining a table of inbound/outbound connections to/from the monitored server (e.g., with an ability to block or terminate connections based on host/port/policy information).

According to the techniques herein, the application context data may be collected by one or more application-based security agents, such as the APM agents described above with reference to the application intelligence platform, or other application-based security processes and/or modules with similar visibility into the application. Different categories of information may be tracked, such as general application information outside of any specific application transaction/business transaction (e.g., runtime housekeeping threads, application components, etc. that have no specific user or transaction context), and application transaction information (e.g., business transaction information for individual transactions), which are single events collected based on entry and exit into the main application/business transaction. Notably, different types of information may be sent at different rates, e.g., versioning information less frequently than general runtime thread information (e.g., sent every 'x' minutes with events as described below), versus sending the application transaction information with each transaction message or once or more per event (e.g., at the end, or once at the start and once upon completion, and so on).

According to one or more embodiments of the present disclosure, information that may be collected and provided (in the various manners described below) can be any information pertinent to security, operation of the application, operation of the network, or other desired and/or configured information, such as information about or relating to the runtime, information about or relating to the application itself, information about or relating to the specific transactions, information about or relating to security (e.g., sensitive operations, exceptions, etc.), and so on. As an example, runtime information may comprise such things as: Application Type (e.g., Tomcat, Jetty, etc.), Application Version, Application Name, OS Type and Version, Account running under, Runtime Version (e.g., java JRE, etc.), Runtime startup options, Starttime, Timezone, Runtime Configuration Vulnerabilities (e.g., Dynamic attach allowed, remote JMX, etc.), Component Vulnerabilities (third party jars to check for vulnerabilities in the NVD, and so on. Application/APM information may comprise such things as: Node name, Tier name, Inbound Correlation Header (request), and Outbound Correlation Header (response), among others. Transaction information may comprise such things as: URL, User, User Role, Thread, AppName, Client IP/Port, Server IP/Port, etc. Security Sensitive Operations Requested may comprise such things as: Open Connections, Network Listeners, Write/Delete/Execute Files, Launch command script, etc., and information provided may include Full stack trace (shows code path), Thread, TimeStamp, Operation Info—Permission needed, action requested, and so on. Security Exceptions (e.g., including core Java as well as third parties like Apache Shiro, etc.) may comprise Login Failures, Access Denied, Security Exceptions, etc., and information provided may comprise: Exception Name, Thread, Full stack trace (shows code path), Cause, Timestamp, and others.

The illustrative communication protocol herein is described with reference generally to the example communication environment 600 of FIG. 6. (The environment 600 is a simplified example, and many different types of devices, topologies, interconnections, and so on may be present, as will be readily appreciated by those skilled in the art.) As shown, a network-based device/process 610, such as a router, firewall, WAF, load balancer, or any network-based device, may provide upstream network communication for an application that passes through an application-based device/process 620 (e.g., a server, a database, an end-user application device, and so on) and to another network-based device/process 630.

Notably, though application-based device/process 620 is shown between two network devices 610/630, the techniques herein may be used where the application-based device/process 620 is either the start or end of the application transaction communication, and the environment is merely shown as such for the purposes of discussion of the many capabilities of the communication protocol described herein.

Also, "downstream" application transaction communications (e.g., 641, 642, 643, 644, etc.) may generally be considered to be the forward path of the application transaction, while "upstream" application transaction communications (e.g., 651, 652, 653, 654, etc.) may generally be considered to be the return/response path of the application transaction. However, communication between devices/process may be unilateral, full duplex, broadcast, multicast, load balanced, duplicated, and so on, and the terms "downstream" and "upstream" are meant to be illustrative for understanding, and not necessarily limiting to the scope of the protocol as described herein.

In one particular embodiment, collected information from the application environment may be sent within the application messages (e.g., piggybacked in headers, described below), or else may be sent to a remote storage location 660 (e.g., communication 661), such as a server, database, or REST interface that can be accessed by interested devices (e.g., communications 662 and 663), and indexed by an identifier (ID) sent within the application messages. The periodicity of the data storage can be any configured or on-demand amount, such as one call per Business Transaction, only storing data if security events exist, only storing data in response to a request for data, only storing particular portions of data at certain times while other portions of data at other times, and so on. Other mechanisms may be used to provide intelligent filtering to mitigate potential performance impact, and those shown specifically herein are merely examples of such mitigation.

Figure 7:
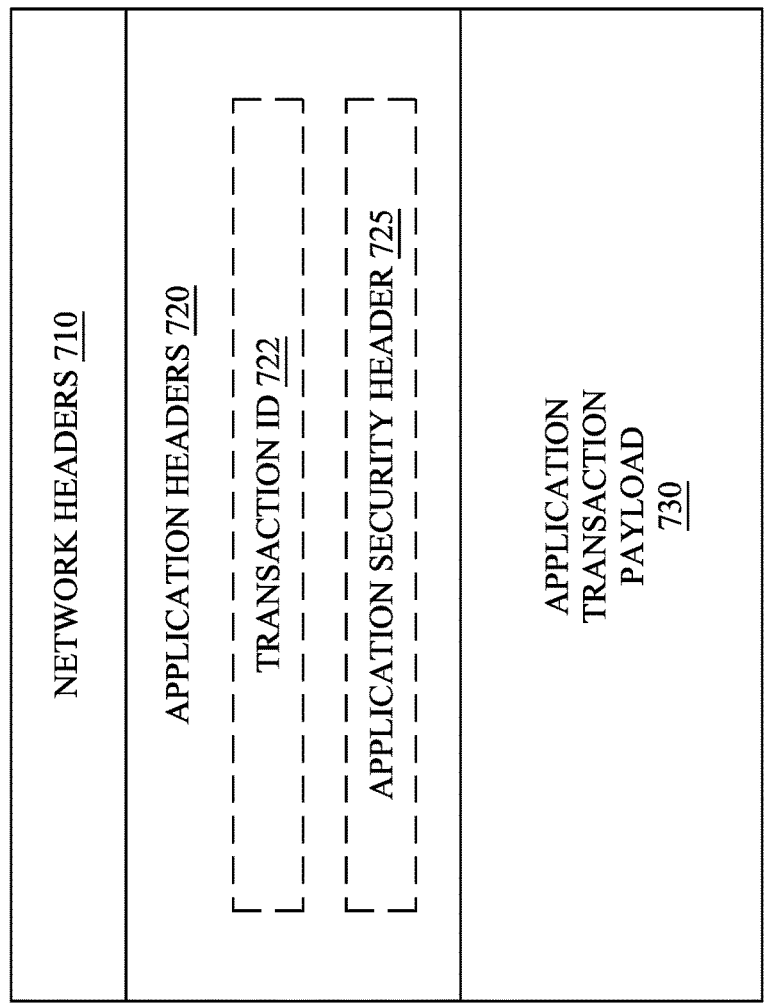
FIG. 7 illustrates an example simplified message format for enhanced web application security communication in accordance with one or more embodiments described herein.

Also, FIG. 7 illustrates an example simplified message format 700 for enhanced web application security communication in accordance with one or more embodiments described herein. In particular, the message 700 comprises one or more network headers 710, such as TCP/IP headers, encapsulation headers, and so on. According to the techniques herein, one or more application headers 720 (e.g., HTTP headers) which may illustratively contain a transaction ID 722 (e.g., security ID, tag, pointer, index, and so on) and/or an application security header 725 (e.g., as a separate header or as a field within the application header 720). Note also that the transaction ID 722 may be alternatively included within the application security header 725, and the view shown herein is not meant to be limiting to the present disclosure. The added information (722 and/or 725) is thus "piggybacked" within the application message 700, which contains the application transaction payload 730 carrying the data pertaining to the actual application transaction (e.g., requests, responses, data transfer, acknowledgments, and so on, as will be appreciated by those skilled in the art).

Generally, as described herein, an associated ID 722 may be placed into the application header (e.g., an HTTP response header as a particular parameter) which can be "seen" by anything downstream on the OS stack and/or a passive monitor on the network, which may be used to associate corresponding instructions, replies, and/or to index into remote database entries (e.g., to query a REST interface) to obtain information (e.g., security context) related to the identified transaction, as described below. In one embodiment, the ID may be any value created by a requesting device (e.g., an ID created by a network security device) or by a replying application agent, while in another embodiment, the ID may be configured to use the business transaction ID or another ID already created and related specifically to the transaction itself. In one embodiment, the security header 725 may include the instruction or reply, which, particularly for the reply, may include requested information, a link to the requested information (e.g., indexed by the transaction ID), or other pertinent information (e.g., acknowledgements, non-acknowledgments, error messages, etc.).

According to the techniques herein, the security piggybacking protocol can be used for both inbound and outbound communication, and can include instructions (commands or requests for information) and replies (information, links/indexes to information, etc.) in any appropriate direction, tied directly to the application transaction's communication channel. For instance, as detailed further below, the header in an inbound/downstream communication may have an appended question from a security device (e.g., network device 610) to request the identity and/or role of a particular user of the traffic, which only the application-based device 620 has knowledge of. Other questions, such as whether the user had admin privileges, what type of server is the application executed on, what version of the application software is being used, and so on, can also be asked. Answers may then be included in/appended to the returning outbound/upstream communication (e.g., including a reply within an application's ACK message) by the responding device, accordingly. As described herein, some responses (or components/portions of a response) could be a substantial amount of information (e.g., too large for insertion into a header, such as a 1 MB data log), so the response may include a web-service ID (e.g., URL) to allow the requestor to obtain the full response from some remote location/third party device (e.g., database 660).

Alternatively, as described herein, the instructions may also be commands, such as, among others, blocking transactions (e.g., RASP commands), forcing re-logins, quarantining users, triggering security escalation (e.g., conditions warrant being suspicious of everything—a.k.a. "paranoia mode"). In this instance, the replies may simply be an ACK or non-ACK indicating whether the recipient device complied with the instruction.

Figure 8:
FIG. 8 illustrates an example of header details generated for enhanced web application security communication in accordance with one or more embodiments described herein.

As an example of a detailed header (e.g., an example transaction response containing a security event and browser patch headers), FIG. 8 illustrates an example of a user interface 800 showing the headers of a response message (e.g., carried in format 700 of FIG. 7 above), illustratively shown in a format presented by a development mode ("Dev Mode") display in a typical web browser application. As shown, general information 810 may be displayed for a reply to an example ping request, as well as specific response headers 820. Note that the illustrative "securityEventId" header contains an example transaction ID (e.g., 722 above) that can be used to query the remote database (e.g., REST interface), as described herein.

Referring again generally to FIG. 6 and FIG. 7, the techniques herein may be used for communication of instructions and replies in a number of different directions, piggybacking on the application communication between the devices/processes of is environment 600. For instance, a first direction of communication may be established from the network-based device/process 610 to the application-based device/process 620 (e.g., from a network device such as a firewall, router, etc., to an application server, agent, process, etc.). For example, any networking upstream module that can insert or modify an application header (e.g., an HTTP header) into an upstream application communication (e.g., 642) can generate the following queries, contained illustratively within the application security header 725 (and associated with the particular transaction ID 722):

- a list of all application components (jars, etc.);
- a list of application configurations;
- a list of all potentially vulnerable application settings;
- a list of all current connections to/from the application (e.g., socket connections, etc.);
- a list of other backend information for this transaction (e.g., databases, WebServices, etc.), which may be provided by an application intelligence platform as described above;
- etc.

Alternatively or in addition, the networking upstream module can also instruct the application device/agent to:
- block the transaction;
- escalate collection for a specific user;
- collect stack traces on every transaction from a user;
- lockout a user;
- add additional information to the event and/or header (can be custom);
- etc.

According to the techniques herein, the application-based device/process 620 (e.g., an agent) can "see" the inbound HTTP headers with the instructions (request or command), and replies by either responding to the request (e.g., inserting a reply in application transaction communication 653, such as in application security header 725, and with the associated transaction ID 722). As described herein, the reply may contain the full response, or may redirect the requestor to an out-of-band remote location to obtain the stored information.

Notably, transaction execution and service connections can be blocked based on a variety of security criteria. For instance, the following example blocking capabilities exist: security and access violations in the OS; execution of code found in the stack trace which is not an authorized package; the discovery of the blocking header (placed by an upstream networking device); security rule specifying that any connections with services at specific host:port be terminated and not allowed to be established (this includes inbound server/outbound client connections); and so on.

Other directions/connections of communication are also afforded by the techniques herein, such as the application-based device/process 620 sending instructions (requests/commands) to network-based device 630 (e.g., over downstream application communication 643) and receiving replies, accordingly (e.g., over upstream communication 652). For example, when the application desires to obtain network-based information or to command network-based action (e.g., firewall blocking), such communication may be used. Similarly, instructions may flow in the reverse (upstream to the application), such as from the network-based device/process 630 to application-based device/process 620 (e.g., over application communication 652), and also from the application-based device/process 620 to the upstream network-based device/process 610 (e.g., over application communication 653). In such instances, the piggybacking communication may proceed over the upstream channel, where replies may utilize a subsequent downstream application communication (e.g., for streams of packets), or else may use other out-of-band mechanisms for replies.

Note that the techniques herein may also be used to "patch" server responses, adding security at the browser. For instance, there are numerous security enhancements added to today's browsers, but the application must enable them via response headers. Unfortunately they are often not used because developers are either not aware of them, don't care to add them, or use third party libraries that are outdated or not updated with these capabilities. Such capabilities include:
X-Frame-Options: SAMEORIGIN [1];
X-XSS-Protection: 1; mode=block [2];
X-Content-Type-Options: nosniff;
Content-Type: text/html; charset=utf-8;
and so on.

In certain embodiments herein, therefore, the techniques herein may add these headers to all outbound responses to the browser which will add significant security capabilities at the user level.

Figure 6:
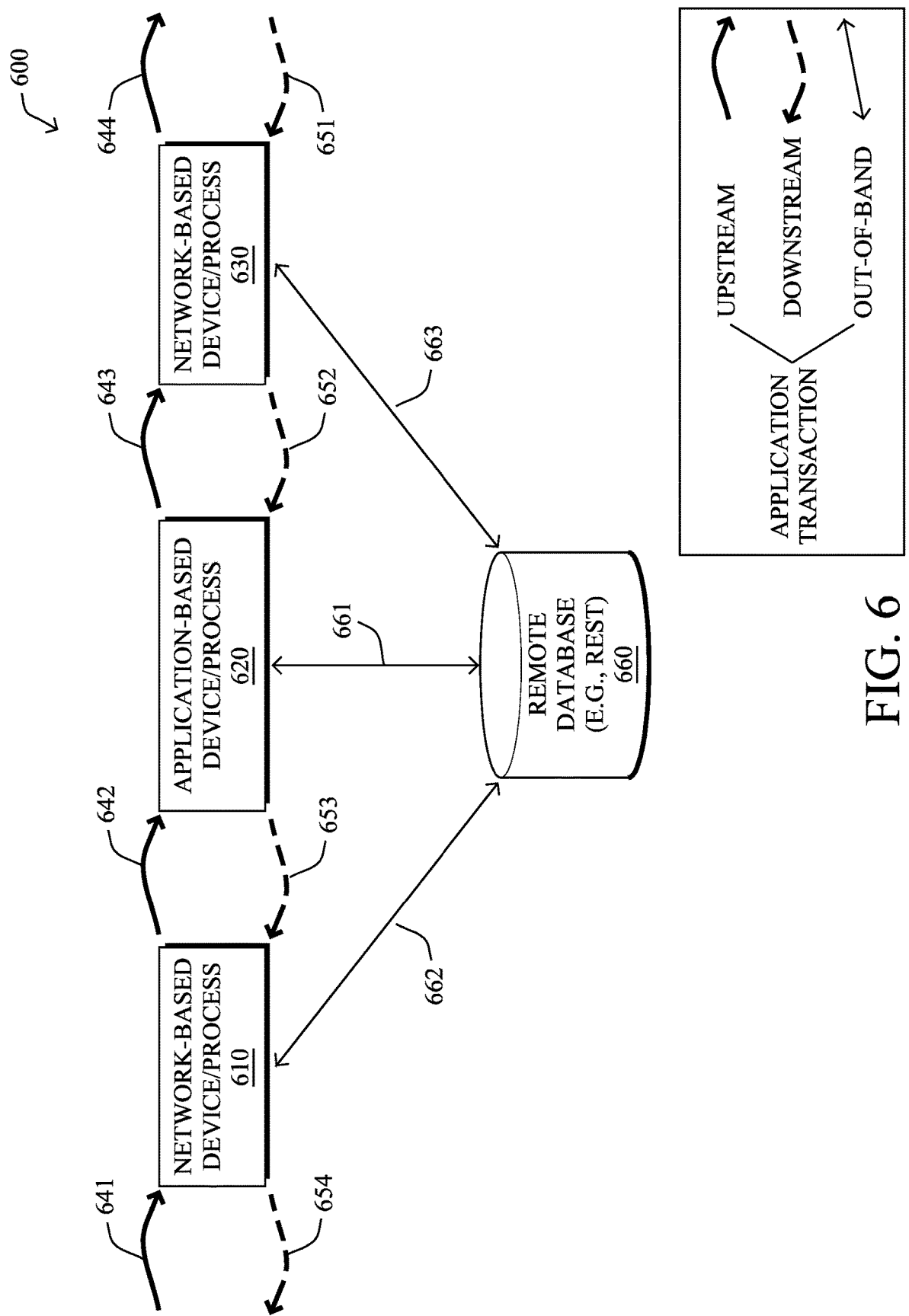
FIG. 6 illustrates an example simplified communication environment for enhanced web application security communication in accordance with one or more embodiments described herein.

According to one or more specific components of the techniques herein, the devices/process in FIG. 6 may also utilize a remote database/interface 660 to store transaction events, whether in general, in response to instructions, or only as-needed due to size limitations. For example, in one embodiment, security events can be generated in the context of the transaction (allowing direct correlation between existing APM flowmaps and the security events), such that at the conclusion of the transaction, if an event occurred, events may be sent to a backend REST endpoint with a transaction ID, and the transaction (HTTP) response can thus contain a header with that transaction ID, such that any networking module that can read the HTTP response (endpoint, passive, router, etc.) can check for the header, and if the header exists, can query the remote location (e.g., REST endpoint) 660 with the transaction ID to obtain the associated events for the transaction.

In particular, the techniques herein may collect security events (e.g., and optionally other performance and/or configuration data) and buffers the events/information during the duration of a transaction. As described above, an event can be triggered by such things as security exceptions, policy-defined permission requests, socket connections, or other miscellaneous operations. Events would thus contain information about what triggered the event, application context such as the user, role, etc., a full code trace showing the line of code triggering the event, APM-related information for correlation/cross referencing, etc. As also described above, the events can also trigger an additional action such as blocking the transaction from completing (e.g., based on the security policy or "orchestrated" by an upstream networking device/endpoint/container that can insert a "command header" into the HTTP request). When the transaction completes, if any events occurred—a "response header" is inserted into the HTTP response which contains a unique ID, such that any networking device that can read the HTTP response can then take the ID and use it in a REST call to a remote endpoint 660 to retrieve all of the events that correlate to that transaction.

Notably, security event objects may include various classes, such as, e.g., a "Security Event" class, which may contain: an event ID; a start time; a stop time; a blocked reason; transaction detail; a generic event, permission event, or exception event (e.g., showing lists, names, messages, libraries, causes, stack traces, stamps, etc.); runtime details; runtime vulnerabilities; runtime components; socket connections (e.g., showing stamps, "isServer", "isNio", stack traces, socket strings, etc.); and so on.

In one embodiment, the "securityEventId" header may only be present if a security event took place during the transaction (this is configurable). The HTTP header contains an ID that can be used to query a REST Management application (e.g., remote database 660) as follows (as an example):

http://localhost:8088/SecurityEventRestService/event/query?id=0808a0b7-48f1-4004-967f-56262fe51a8e.

The response is a list of all security events described in JSON—which may be parsed and serialized before consumption by an integrated security product.

Note that although one embodiment provides the event data to the remote storage location 660 in response to security events, other embodiments herein may regularly update the remote database with non-event information, such as application parameters, configurations, connections, and so on, such that network devices can query the information as-needed and as already collected and stored.

As examples of the capabilities of the techniques herein, firewalls (e.g., a standard firewall or a Web Application Firewall (WAF)), which can be on the network or within an operating system (OS), is by design in-line with the application transaction communication, and is both upstream (request) and downstream (reply) from an Application Stack.

In a first example, assume that a specific user keeps attempting to login, and continues to cause login failures on the application, perhaps occurring at a rapid rate. This is typical of a Denial of Service (DoS) attack, as it consumes resources on the Application to continue to reject these attempts. At some point the application using the techniques herein sends a "please block" request header in a 401 response message (i.e., with the transaction ID). The firewall would then see this request in the response message, and can set either a permanent or temporary (timed) rule blocking inbound requests based on either IP, routing (Via Header), or other identifying aspects in the requests so that the Application no longer has to deal with this issue using Application cycles.

In a second example, assume that a firewall sees something "suspicious" in a session—and places a "whoami" request into the request header using the protocol defined herein. As such, the application (process/agents) would see this instruction (request), and may supplies a response header that says, "the user is 'adminuser', is privileged, and the role is administrator". Here, the firewall may determine from the response and may realize that this is no ordinary session—but a privileged session—and then checks the IP address and finds that the geo location for the IP is in a particular country. Assuming that firewall rules say privileged logins are only allowed from geo locations within countries other than the particular country of the IP address, then the firewall may send a "please block" and "new password account" request to the application. As such, the application terminates that session and requires a new login. Now, when a new login is attempted, the firewall detects and blocks the request based on the IP. However, if the attacker finds another originating IP and makes it past the firewall, based on the techniques herein the account would also be disabled by the application until a new password can be created. At this time, the application may send a "please block" request to the firewall for the new IP address, and now the firewall is aware of the attackers new address and can start blocking that IP address as well.

FIGS. 9-13 offer additional examples of security events and reports made possible by the techniques herein.

In particular, assume that an "open file" event (e.g., Open Sensitive File—sensitive.txt>generates an event that results in blocking transaction execution. An exception report may be generated (e.g., HTTP Status 500 ? Internal Server Error) that shows an error message (e.g., "Permission ("java.io.FilePermission" "sensitive.txt" "write") was not granted due to Unauthorized Context . . . "), with a corresponding description (e.g., "The server encountered an unexpected condition that prevented it from fulfilling the request."), and exception file. In this instance, FIG. 9 illustrates an example Security Event 900 generated, showing an EventID 905, Transaction Start/Stop 910/915, Transaction Details 920, Blocked info 925, other Miscellaneous Security Events 930, and a list of Permission Request Events 935.

Figure 12:
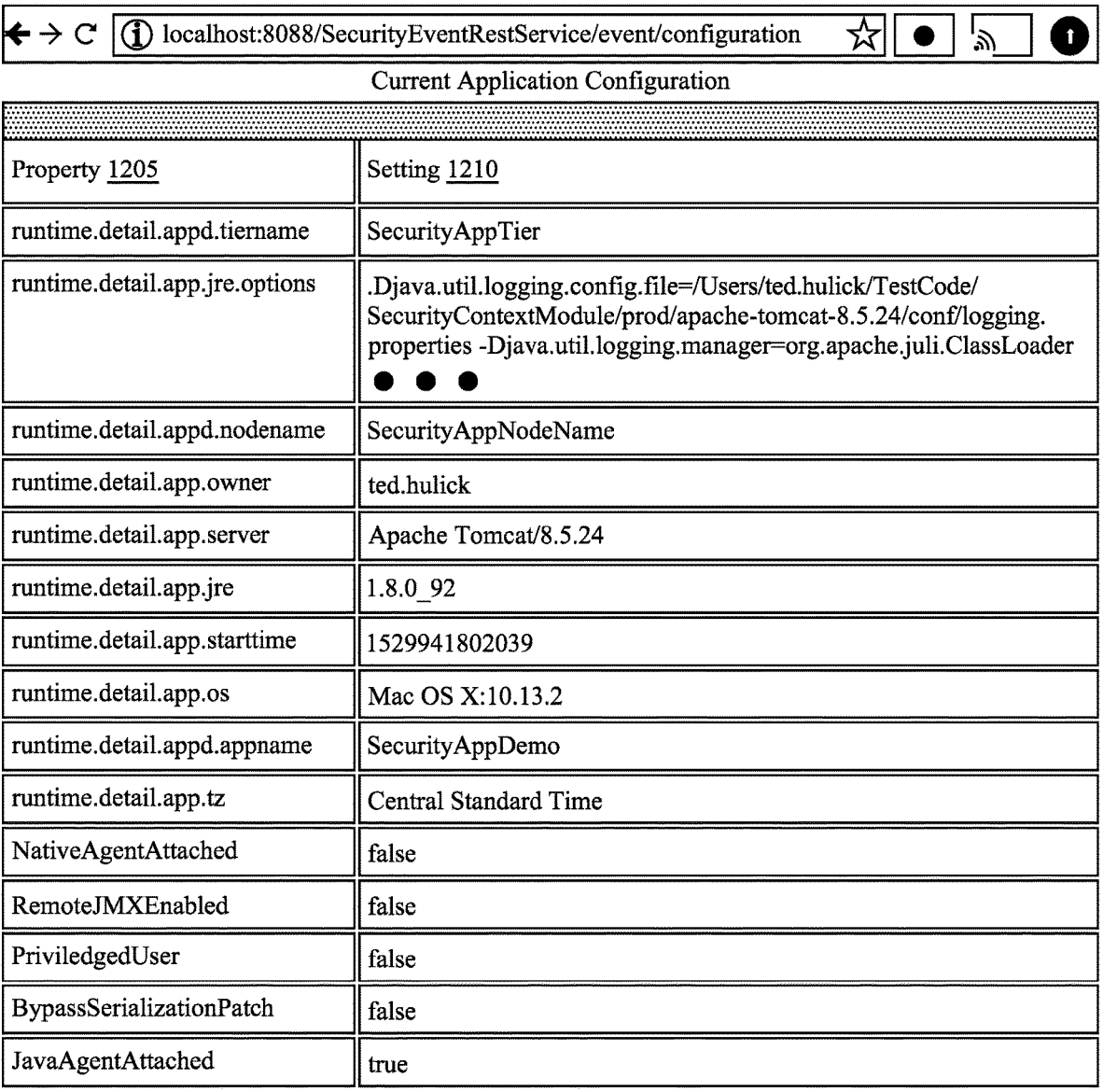
FIG. 12 illustrates an example user interface showing a listing of application configurations generated in accordance with one or more embodiments described herein.
Figure 13:
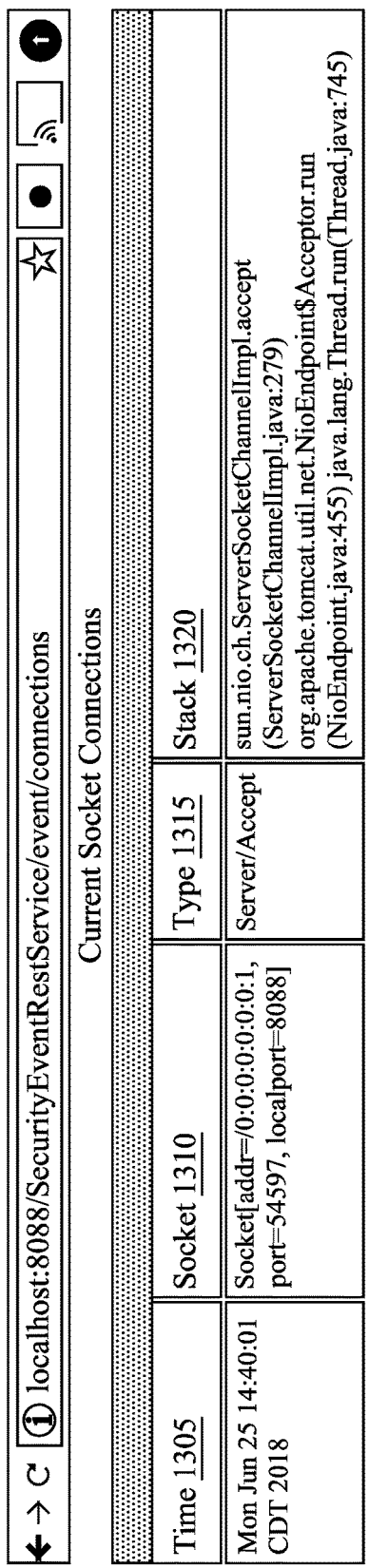
FIG. 13 illustrates an example user interface showing a listing of application connections generated in accordance with one or more embodiments described herein.

As another example, assume that an Access Control Exception occurs (e.g., Unauthorized access to application configuration file), which also results in an exception being thrown. As shown in FIG. 10, a security event 1000 is generated, but now, with reference to FIG. 11, a listing 1100 of the application components is also shown, indicating for each JarFile 1105 a manifest 1110 of component parameters. FIG. 12 illustrates an example report of application configurations 1200 showing illustrative properties 1205 and settings 1210 of the application at the time of the event. Lastly, the interface in FIG. 13 illustrates the application connections 1300 (e.g., time 1305, socket 1310, type 1315, stack 1320) during the application's security event. According to the techniques herein, any of this information in FIGS. 9-13 may be used for security is protocol decisions and actions, or may be reported and displayed for administrator investigation.

It is worth noting that various properties may be configured with regard to the security-based operation of the communication protocol described herein. For instance, the following options may be configured according to the techniques herein: number of event threads to send, how often to generate runtime events, when to provide a full stack trace, where to send the information, which types and/or classes of exceptions to include in reports (if not all), and so on. Also, according to certain embodiments herein, diagnostics servers and/or a software development kits (SDKs) may also exist for testing, troubleshooting, and reporting diagnostics, such as to create events (e.g., requests, exceptions, connection attempts, etc.), show all threads, runtime, instrumentation, properties, network, classloaders, loaded class, local threads, memory, files, logs, statistics, etc.

Notably, in most cases, the application server will be behind a Load Balancer, Proxy, or some other network equipment and will be non-encrypted (standard HTTP). However, if encryption such as SSL is used, though it would not affect the Security Agent, it could impact the downstream network product/device. In one embodiment, the techniques herein may provide the private key to decrypt the packet header to devices in need of it, or may simply send the event directly to the product/device. Alternatively, in situations where the downstream equipment cannot "see" the HTTP Headers because it is encrypted (e.g., TLS/SSL), the techniques herein may also include a special "beaconing" capability that would generate a broadcast or multicast UDP transmission (e.g., to a specific port) with the original event or event ID in unencrypted clear text (e.g., after scrubbing sensitive data) that can be seen by downstream network devices.

Figure 14:
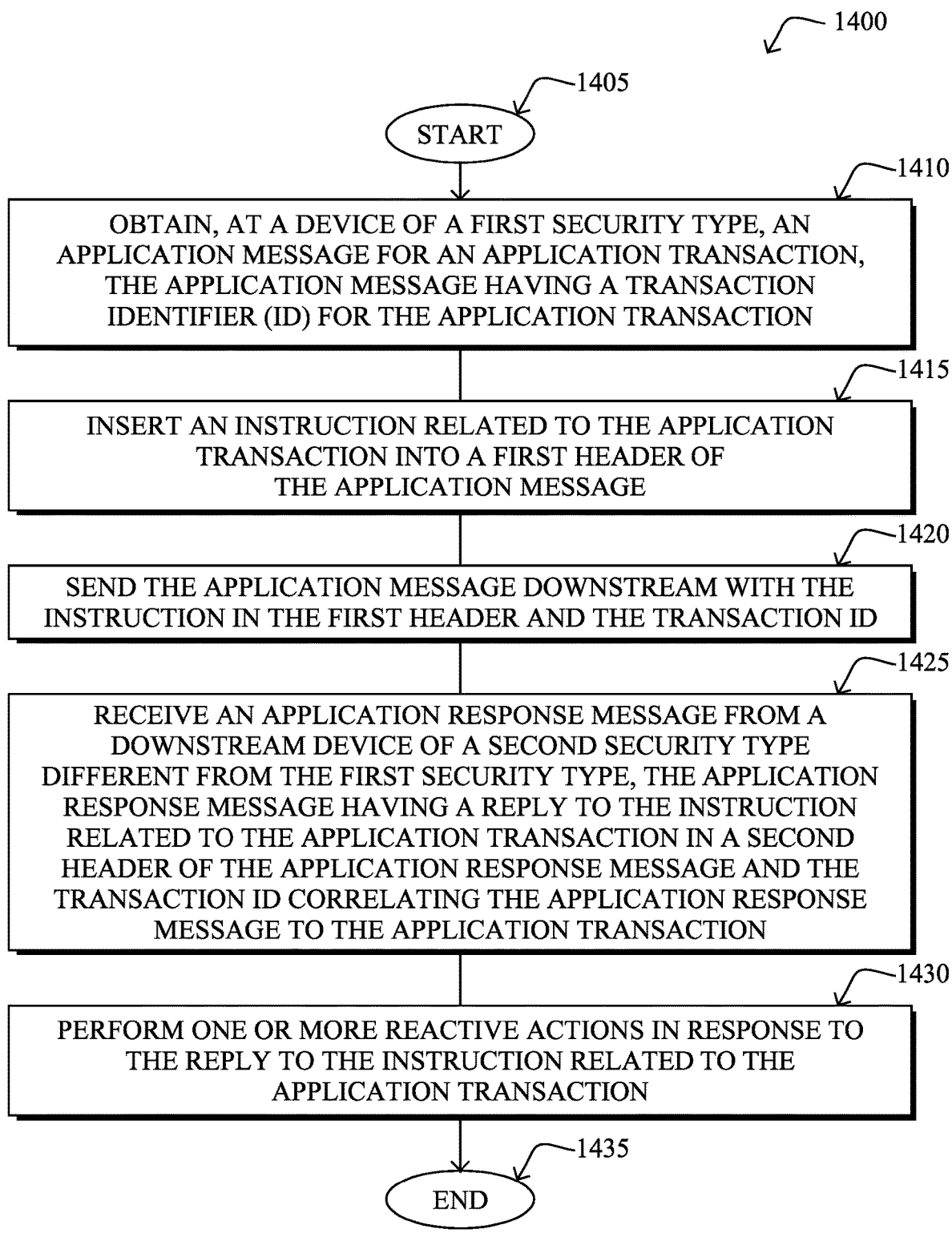
FIG. 14 illustrates an example simplified procedure for enhanced web application security communication in accordance with one or more embodiments described herein, particularly from the perspective of either an application-based security product/service or a network-based security product/service sending out instructions and receiving replies.

In closing, FIG. 14 illustrates an example simplified procedure for enhanced web application security communication in accordance with one or more embodiments described herein, particularly from the perspective of either an application-based security product/service or a network-based security product/service sending out instructions and receiving replies, as detailed above. For example, a non-generic, specifically configured device (e.g., device 200) may perform procedure 1400 by executing stored instructions (e.g., process 248). The procedure 1400 may start at step 1405, and continues to step 1410, where, as described in greater detail above, a device of a first security type (e.g., either a network-based device or an application-based device) obtains an application message 700 (e.g., 641, 642, 643, etc.) for an application transaction, the application message having a transaction identifier (ID) 722 for the application transaction (e.g., a business transaction ID or otherwise). Notably, the first security type may be a network-based security process and a second security type (below) may then be an application-based security process. Conversely, the first security type may be an application-based security process and the second security type may then be a network-based security process. In other words, the perspective of procedure 1400 generally depends on whichever device from environment 600 of FIG. 6 is performing the procedure. That is, the techniques herein are directed to providing a piggybacking communication protocol for different types of security devices/processes, and each type of device/process described herein may use the protocol to communicate instructions and/or replies on top of the application transaction messages as desired.

According to the techniques herein, in step 1415, the device may insert an instruction related to the application transaction into a first header 720/725 of the application message 700. As described above, the instruction may be one of either a question related to the application transaction (e.g., requesting a user associated with the application transaction; requesting a permission role of a user associated with the application; requesting device components on which the application transaction is being executed; requesting configuration settings of an application in which the application transaction is being executed; requesting configuration settings of a device on which the application transaction is being executed; etc.) or a command related to the application transaction (e.g., blocking the application transaction; forcing a logout in the application transaction; quarantining the application transaction; escalating a security level of the application transaction; etc.). In step 1420, the device may then send the application message 700 downstream with the instruction in the first header 720/725 and the transaction ID 722

In step 1425, the device may then receive an application response message 700 (e.g., 651, 652, 653, etc.) from a downstream device in response to the application message (the downstream device of a second security type different from the first security type). As described above, the application response message has a reply to the instruction related to the application transaction in another header 720/725 of the application response message 700 and the transaction ID 722 correlating the application response message to the application transaction. The reply may be any response such as a direct answer to the question, a link to a web location having an answer to the question (e.g., the REST interface), an acknowledgement (ACK) to performance of the instructions, a non-acknowledgment to performance of the instructions; a link to a location of a security log generated for the application transaction (e.g., the REST interface), and so on. For instance, the reply may be associated with an answer comprising any of the information types listed above, such as runtime information, application information, transaction information, security information, etc. (Note that the instruction and reply may be associated with the application transaction individually and/or the application as a whole in which the application transaction is being executed.)

Accordingly, in step 1430, the techniques herein may then perform one or more "reactive actions" in response to the reply to the instruction related to the application transaction. For example, the instructing device may display the information, report on it, monitor it, detect anomalies based on it, adjust security settings, change network traffic (e.g., block, redirect, quarantine, etc.), log completion of an action, and so on. In particular embodiments herein, the reactive action may relate specifically to security operations, such as those described above, as well as any others so configured on the device.

The simplified procedure 1400 may then end in step 1435, notably with the ability to continue communicating according to the techniques herein. Other steps may also be included generally within procedure 1400. For example, such steps (or, more generally, such additions to steps already specifically illustrated above), may include: generating a security log for the application transaction and storing the security log remotely from the device, where the instruction includes a web link to the stored security log; as well as generating an additional log for an application in which the application transaction is being executed and storing the additional log remotely from the device, where the instruction includes a web link to the stored additional log; and so on.

Figure 15:
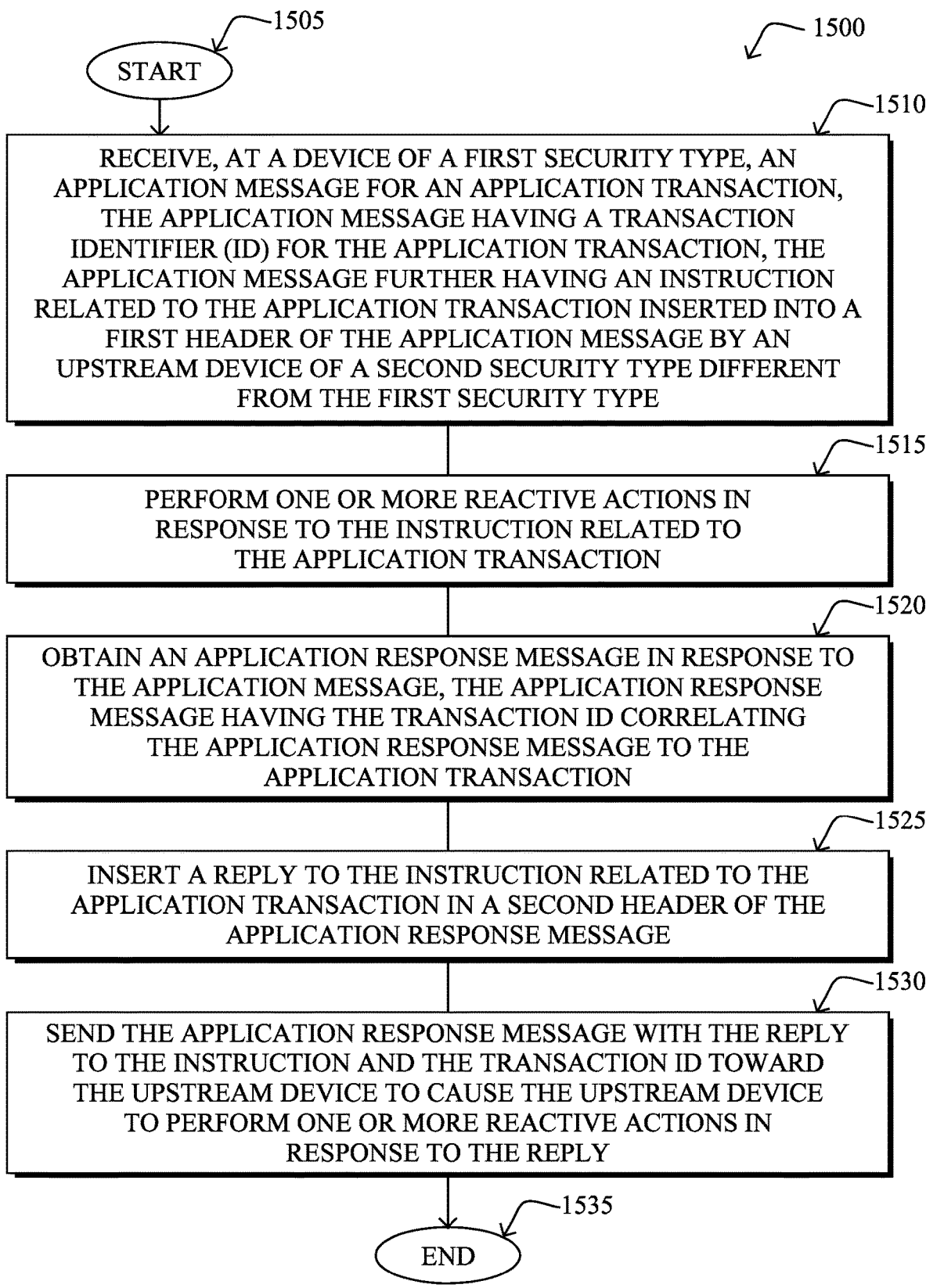
FIG. 15 illustrates another example simplified procedure for enhanced web application security communication in accordance with one or more embodiments described herein, particularly from the perspective of either an application-based security product/service or a network-based security product/service receiving instructions and sending back replies.

In addition, FIG. 15 illustrates another example simplified procedure for enhanced web application security communication in accordance with one or more embodiments described herein, particularly from the perspective of either an application-based security product/service or a network-based security product/service receiving instructions and sending back replies, as detailed above. For example, a non-generic, specifically configured device (e.g., device 200) may perform procedure 1500 by executing stored instructions (e.g., process 248). The procedure 1500 may start at step 1505, and continues to step 1510, where, as described in greater detail above, a device of a first security type (again, network-based or application-based device/process) receives an application message 700 (e.g., 641, 642, 643, etc.) for an application transaction, the application message having a transaction ID 722 for the application transaction, the application message further having an instruction related to the application transaction inserted into a first header 720/725 of the application message by an upstream device of a second security type different from the first security type.

As described above in greater detail, in step 1515 the receiving device may now perform one or more "reactive actions" in response to the instruction related to the application transaction, such as collecting information, sharing information, performing one or more security actions (e.g., blocking, flagging, restricting, logging, reporting, etc.), ceasing transactions, stopping traffic, and so on, depending upon the instruction, the type of device, the level of mitigation, and so on.

When the device obtains an application response message (e.g., 651, 652, 653, etc.) in step 1520 in response to the application message (e.g., generating the application response message in response to the application message or receiving the application response message having been generated by an application endpoint further downstream in response to the application message), then in step 1525 the device may insert a reply to the instruction related to the application transaction in a second header of the application response message. For instance, the reply may be an acknowledgment, requested information, a link to the requested information, and so on, as mentioned above. In step 1530, the device may then send the application response message 700 with the reply (in header 720/725) and the transaction ID 722 (correlating the application response message to the application transaction) toward the upstream device to cause the upstream device to perform one or more reactive actions in response to the reply, accordingly.

The simplified procedure 1500 may then end in step 1535, notably with the ability to continue communicating according to the techniques herein.

It should be noted that while certain steps within procedures 1400-1500 may be optional as described above, the steps shown in FIGS. 14-15 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1400-1500 are described separately, certain steps from each procedure may be incorporated into each other procedure, and the procedures are not meant to be mutually exclusive. Still further, while procedures 1400-1500 have been described broadly in terms of both perspective and operation, the techniques herein may apply any of the more specific implementation details of exactly which device is sending or receiving the communication, what actions are taken, and so on. In other words, while the procedures 1400-1500 are focused on the communication protocol between devices, the advanced security measures afforded by the collaboration between network-based security devices and application-based security devices (i.e., based on the communication protocol bridging the gap between these two security types) may make use of these procedures as a specific embodiment of the present disclosure, such as in accordance with the details and examples given above.

The techniques described herein, therefore, provide for an enhanced web application security communication protocol, integrating application metrics and commands into network infrastructure control. In particular, the techniques herein combine the security viewpoints and control from a network perspective and an application perspective into a full picture of security, allowing different equipment with different capabilities and views to work together intelligently, thus unifying multiple technologies into a stronger security solution. That is, by integrating application security with network security through the inclusion (piggybacking) of application data into the HTTP headers, security controls can be based on application data, but handled by network elements anywhere in the network. Specifically, the techniques herein allow the different security product types, which have different instrumentation capabilities and limitations (and that see different security situations), to have a common way of sharing and correlating the occurrence of a security incident as it traverses through the network, in a full-duplex, multi-command, actionable, cross-platform, and cross-instrumentation domain.

In still further embodiments of the techniques herein, a business impact of the web application security can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the security incidents and/or control with various business transactions in order to better understand the effect on the business transactions, accordingly.

Illustratively, the techniques described herein may be performed by hardware, software, and/or firmware, such as in accordance with the illustrative web application security communication process 248, which may include computer executable instructions executed by the processor 220 (or independent processors on network interfaces 210) to perform functions relating to the techniques described herein, e.g., in conjunction with corresponding processes of other devices in the computer network as described herein (e.g., on network agents, controllers, computing devices, servers, etc.). Notably, the process 248 may be configured specifically as a standalone agent running side-by-side to the application performance management (APM) agent or application intelligence platform agent (i.e., a two-agent solution), or else as a single agent shared with the APM agent or application intelligence platform agent (e.g., an invoked startup hook (i.e., a special jar with a manifest pointing to a main class to be launched when the application/APM agent is launched) or a loaded dynamic service (i.e., special plugins that can launched inside the application/APM Agent). In either configuration (side-by-side OR integrated), unlike other RASP solutions, the techniques herein use the application-based security information from the application agent in reporting to upstream and/or downstream network-based security components (e.g., firewalls, routers, switches, WAFs, etc.).

According to embodiments herein, a method herein may comprise: obtaining, at a device of a first security type, an application message for an application transaction, the application message having a transaction identifier (ID) for the application transaction; inserting, by the device, an instruction related to the application transaction into a first header of the application message; sending, by the device, the application message downstream with the instruction in the first header and the transaction ID; receiving, at the device, an application response message from a downstream device in response to the application message, the downstream device of a second security type different from the first security type, the application response message having a reply to the instruction related to the application transaction in a second header of the application response message and the transaction ID correlating the application response message to the application transaction; and performing, by the device, one or more reactive actions in response to the reply to the instruction related to the application transaction.

According to embodiments herein, an additional method herein may comprise: receiving, at a device of a first security type, an application message for an application transaction, the application message having a transaction identifier (ID) for the application transaction, the application message further having an instruction related to the application transaction inserted into a first header of the application message by an upstream device of a second security type different from the first security type; performing, by the device, one or more reactive actions in response to the instruction related to the application transaction; obtaining, by the device, an application response message in response to the application message, the application response message having the transaction ID correlating the application response message to the application transaction; inserting, by the device, a reply to the instruction related to the application transaction in a second header of the application response message; and sending, by the device, the application response message with the reply to the instruction and the transaction ID toward the upstream device to cause the upstream device to perform one or more reactive actions in response to the reply. In one embodiment of this method, obtaining comprises one of either: generating the application response message in response to the application message; or receiving the application response message having been generated by an application endpoint in response to the application message.

In one embodiment, the instruction is one of either a question related to the application transaction or a command related to the application transaction. In one embodiment, the question is selected from a group consisting of: requesting a user associated with the application transaction; requesting a permission role of a user associated with the application; requesting device components on which the application transaction is being executed; requesting configuration settings of an application in which the application transaction is being executed; and requesting configuration settings of a device on which the application transaction is being executed; and the command is selected from a group consisting of: blocking the application transaction; forcing a logout in the application transaction; quarantining the application transaction; and escalating a security level of the application transaction. In one embodiment, the reply is selected from a group consisting of: a direct answer to the question; a link to a web location having an answer to the question; an acknowledgement to performance of the instructions; a non-acknowledgment to performance of the instructions; and a link to a location of a security log generated for the application transaction. In one embodiment, the instruction and reply are associated with one or both of either the application transaction individually or an application in which the application transaction is being executed. In one embodiment, the reply is associated with an answer comprising one or more of runtime information, application information, transaction information, and security information. In one embodiment, the first security type is a network-based security process and wherein the second security type is an application-based security process. In one embodiment, the first security type is an application-based security process and wherein the second security type is a network-based security process. In one embodiment, the application-based security process generates a security log for the application transaction; and stores the security log remotely from the device; wherein the instruction includes a web link to the stored security log. In one embodiment, the application-based security process generates an additional log for an application in which the application transaction is being executed; and stores the additional log remotely from the device; wherein the instruction includes a web link to the stored additional log.

According to embodiments herein, a tangible, non-transitory, computer-readable medium herein may have computer-executable instructions stored thereon that, when executed by a processor on a computing device of a first security type, may cause the computing device to perform a method comprising: obtaining an application message for an application transaction, the application message having a transaction identifier (ID) for the application transaction; inserting an instruction related to the application transaction into a first header of the application message; sending the application message downstream with the instruction in the first header and the transaction ID; receiving an application response message from a downstream device in response to the application message, the downstream device of a second security type different from the first security type, the application response message having a reply to the instruction related to the application transaction in a second header of the application response message and the transaction ID correlating the application response message to the application transaction; and performing one or more reactive actions in response to the reply to the instruction related to the application transaction.

According to embodiments herein, an additional tangible, non-transitory, computer-readable medium herein may have computer-executable instructions stored thereon that, when executed by a processor on a computing device of a first security type, may cause the computing device to perform a method comprising: receive an application message for an application transaction, the application message having a transaction identifier (ID) for the application transaction, the application message further having an instruction related to the application transaction inserted into a first header of the application message by an upstream device of a second security type different from the first security type; perform one or more reactive actions in response to the instruction related to the application transaction; obtain an application response message in response to the application message, the application response message having the transaction ID correlating the application response message to the application transaction; insert a reply to the instruction related to the application transaction in a second header of the application response message; and send the application response message with the reply to the instruction and the transaction ID toward the upstream device to cause the upstream device to perform one or more reactive actions in response to the reply.

Further, according to embodiments herein an apparatus herein may comprise: one or more network interfaces to communicate with a network; a processor coupled to the network interfaces and configured to execute one or more processes; and a memory configured to store a process of a first security type executable by the processor, the process, when executed, configured to: obtain an application message for an application transaction, the application message having a transaction identifier (ID) for the application transaction; inserting an instruction related to the application transaction into a first header of the application message; send the application message downstream with the instruction in the first header and the transaction ID; receive an application response message from a downstream device in response to the application message, the downstream device of a second security type different from the first security type, the application response message having a reply to the instruction related to the application transaction in a second header of the application response message and the transaction ID correlating the application response message to the application transaction; and perform one or more reactive actions in response to the reply to the instruction related to the application transaction.

Still further, according to embodiments herein an additional apparatus herein may comprise: one or more network interfaces to communicate with a network; a processor coupled to the network interfaces and configured to execute one or more processes; and a memory configured to store a process of a first security type executable by the processor, the process, when executed, configured to: receive an application message for an application transaction, the application message having a transaction identifier (ID) for the application transaction, the application message further having an instruction related to the application transaction inserted into a first header of the application message by an upstream device of a second security type different from the first security type; perform one or more reactive actions in response to the instruction related to the application transaction; obtain an application response message in response to the application message, the application response message having the transaction ID correlating the application response message to the application transaction; insert a reply to the instruction related to the application transaction in a second header of the application response message; and send the application response message with the reply to the instruction and the transaction ID toward the upstream device to cause the upstream device to perform one or more reactive actions in response to the reply.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    obtaining, at a device of a first security type, an application message for an application transaction, the application message having a transaction identifier (ID) for the application transaction;
    inserting, by the device, an instruction related to the application transaction into a first header of the application message;
    sending, by the device, the application message downstream with the instruction in the first header and the transaction ID;
    receiving, at the device, an application response message from a downstream device in response to the application message, the downstream device of a second security type different from the first security type, the application response message having a reply to the instruction related to the application transaction in a second header of the application response message and the transaction ID correlating the application response message to the application transaction; and
    performing, by the device, one or more reactive actions in response to the reply to the instruction related to the application transaction,
    wherein the reply comprises at least one of: a direct answer to a question in the instruction; a link to a web location having an answer to a question in the instruction; an acknowledgement to performance of a command in the instruction; a non-acknowledgment to performance of a command in the instruction; or a link to a location of a security log generated for the application transaction.

2. The method as in claim 1, wherein the instruction is one of either a question related to the application transaction or a command related to the application transaction.

3. The method as in claim 2, wherein:
    the question comprises at least one of: requesting a user associated with the application transaction; requesting a permission role of a user associated with the application; requesting device components on which the application transaction is being executed; requesting configuration settings of an application in which the application transaction is being executed; or requesting configuration settings of a device on which the application transaction is being executed; and
    the command comprises at least one of: blocking the application transaction; forcing a logout in the application transaction; quarantining the application transaction; or escalating a security level of the application transaction.

4. The method as in claim 1, wherein the instruction and reply are associated with one or both of either the application transaction individually or an application in which the application transaction is being executed.

5. The method as in claim 1, wherein the reply is associated with an answer comprising one or more of runtime information, application information, transaction information, and security information.

6. The method as in claim 1, wherein the first security type is a network-based security process and wherein the second security type is an application-based security process.

7. The method as in claim 1, wherein the first security type is an application-based security process and wherein the second security type is a network-based security process.

8. The method as in claim 7, further comprising:
    generating a security log for the application transaction;
    storing the security log remotely from the device; and
    wherein the instruction includes a web link to the stored security log.

9. The method as in claim 8, further comprising:
    generating an additional log for an application in which the application transaction is being executed;
    storing the additional log remotely from the device; and
    wherein the instruction includes a web link to the stored additional log.

10. A method, comprising:
    receiving, at a device of a first security type, an application message for an application transaction, the application message having a transaction identifier (ID) for the application transaction, the application message further having an instruction related to the application transaction inserted into a first header of the application message by an upstream device of a second security type different from the first security type;
    performing, by the device, one or more reactive actions in response to the instruction related to the application transaction;
    obtaining, by the device, an application response message in response to the application message, the application response message having the transaction ID correlating the application response message to the application transaction;
    inserting, by the device, a reply to the instruction related to the application transaction in a second header of the application response message; and
    sending, by the device, the application response message with the reply to the instruction and the transaction ID toward the upstream device to cause the upstream device to perform one or more reactive actions in response to the reply,
    wherein the reply comprises at least one of: a direct answer to a question in the instruction; a link to a web location having an answer to a question in the instruction; an acknowledgement to performance of a command in the instruction; a non-acknowledgment to performance of a command in the instruction; or a link to a location of a security log generated for the application transaction.

11. The method as in claim 10, wherein the instruction is one of either a question related to the application transaction or a command related to the application transaction.

12. The method as in claim 11, wherein:
    the question comprises at least one of: requesting a user associated with the application transaction; requesting a permission role of a user associated with the application; requesting device components on which the application transaction is being executed; requesting configuration settings of an application in which the application transaction is being executed; or requesting configuration settings of a device on which the application transaction is being executed; and
    the command comprises at least one of: blocking the application transaction; forcing a logout in the application transaction; quarantining the application transaction; or escalating a security level of the application transaction.

13. The method as in claim 10, wherein the instruction and reply are associated with one or both of either the application transaction individually or an application in which the application transaction is being executed.

14. The method as in claim 10, wherein the reply is associated with an answer comprising one or more of runtime information, application information, transaction information, and security information.

15. The method as in claim 10, wherein the first security type is a network-based security process and wherein the second security type is an application-based security process.

16. The method as in claim 10, wherein the first security type is an application-based security process and wherein the second security type is a network-based security process.

17. The method as in claim 10, wherein obtaining comprises one of either: generating the application response message in response to the application message; or receiving the application response message having been generated by an application endpoint in response to the application message.

18. A tangible, non-transitory, computer-readable medium having computer-executable instructions stored thereon that, when executed by a processor on a computing device of a first security type, cause the computing device to perform a method comprising:

obtaining an application message for an application transaction, the application message having a transaction identifier (ID) for the application transaction;

inserting an instruction related to the application transaction into a first header of the application message;

sending the application message downstream with the instruction in the first header and the transaction ID;

receiving an application response message from a downstream device in response to the application message, the downstream device of a second security type different from the first security type, the application response message having a reply to the instruction related to the application transaction in a second header of the application response message and the transaction ID correlating the application response message to the application transaction; and performing one or more reactive actions in response to the reply to the instruction related to the application transaction, wherein the reply comprises at least one of: a direct answer to a question in the instruction; a link to a web location having an answer to a question in the instruction; an acknowledgement to performance of a command in the instruction; a non-acknowledgment to performance of a command in the instruction; or a link to a location of a security log generated for the application transaction.

* * * * *

UNITED STATES PATENT AND TRADEMARK OFFICE
CERTIFICATE OF CORRECTION

| | | |
|---|---|---|
| PATENT NO. | : 11,343,281 B2 | |
| APPLICATION NO. | : 16/542397 | |
| DATED | : May 24, 2022 | |
| INVENTOR(S) | : Walter Theodore Hulick | |

It is certified that error appears in the above-identified patent and that said Letters Patent is hereby corrected as shown below:

In the Specification

Column 21, Line 52, please amend as shown:
the devices/processes of environment 600. For instance, a Column 25, Line 15, please amend as shown:
may be used for security protocol decisions and actions, Signed and Sealed this
Twentieth Day of September, 2022

Katherine Kelly Vidal
*Director of the United States Patent and Trademark Office*